US012068094B2

(12) United States Patent
Fujihara et al.

(10) Patent No.: US 12,068,094 B2
(45) Date of Patent: Aug. 20, 2024

(54) RESISTOR UNIT, MANUFACTURING METHOD THEREFOR, AND DEVICE PROVIDED WITH RESISTOR UNIT

(71) Applicant: SEMITEC Corporation, Tokyo (JP)

(72) Inventors: Shingo Fujihara, Tokyo (JP); Yuji Jumonji, Tokyo (JP)

(73) Assignee: SEMITEC Corporation, Tokyo (JP)

( * ) Notice: Subject to any disclaimer, the term of this patent is extended or adjusted under 35 U.S.C. 154(b) by 0 days.

(21) Appl. No.: 17/636,361

(22) PCT Filed: Aug. 21, 2020

(86) PCT No.: PCT/JP2020/031622

§ 371 (c)(1),
(2) Date: Feb. 18, 2022

(87) PCT Pub. No.: WO2021/044876

PCT Pub. Date: Mar. 11, 2021

(65) Prior Publication Data

US 2022/0301750 A1 Sep. 22, 2022

(30) Foreign Application Priority Data

Sep. 4, 2019 (JP) ................................ 2019-161270

(51) Int. Cl.
*H01C 17/242* (2006.01)
*H01C 1/142* (2006.01)
(Continued)

(52) U.S. Cl.
CPC ........... *H01C 17/242* (2013.01); *H01C 1/142* (2013.01); *H01C 1/144* (2013.01); *H01C 7/008* (2013.01)

(58) Field of Classification Search
CPC .... H01C 17/242; H01C 17/245; H01C 1/142; H01C 1/144; H01C 7/008
See application file for complete search history.

(56) References Cited

U.S. PATENT DOCUMENTS 4,031,499 A * 6/1977 Brueckner ........... H01C 1/1406 338/23
6,081,182 A * 6/2000 Tomozawa ............ H01C 7/041 338/28
(Continued)

FOREIGN PATENT DOCUMENTS

CN 1252887 5/2000
CN 1395734 2/2003
(Continued)

OTHER PUBLICATIONS

"International Search Report (Form PCT/ISA/210) of PCT/JP2020/031622", mailed on Nov. 17, 2020, with English translation thereof, pp. 1-4.

(Continued)

*Primary Examiner* — Kyung S Lee
(74) *Attorney, Agent, or Firm* — JCIPRNET

(57) ABSTRACT

Provided are: a resistor unit; a manufacturing method therefor; and a device provided with a resistor unit. A resistor unit is equipped with a resistor and at least one pair of electrode layers formed on the resistor. In at least one of the electrode layers, a removal part for trimming is formed in a region, from among regions where the electrode layers are formed, that excludes the peripheral edges of such layers. The resistor is a thermosensitive resistor, for example.

10 Claims, 7 Drawing Sheets

(51) Int. Cl.

| | |
|---|---|
| ***H01C 1/144*** | (2006.01) |
| ***H01C 7/00*** | (2006.01) |

(56) References Cited

U.S. PATENT DOCUMENTS

| | | | | |
|---|---|---|---|---|
| 2002/0125985 A1* | 9/2002 | Tsukada | H01C 7/003 338/195 | |
| 2016/0240291 A1* | 8/2016 | Tanaka | H01C 1/142 | |

FOREIGN PATENT DOCUMENTS

| | | |
|---|---|---|
| CN | 1722316 | 1/2006 |
| CN | 101268526 | 9/2008 |
| CN | 105765671 | 7/2016 |
| CN | 107077933 | 8/2017 |
| CN | 108369845 | 8/2018 |
| JP | S5654321 | 5/1981 |
| JP | S57206003 | 12/1982 |
| JP | S60177601 | 9/1985 |
| JP | S63128605 | 6/1988 |
| JP | H0258803 | 2/1990 |
| JP | H0677007 | 3/1994 |
| JP | H0864402 | 3/1996 |
| JP | 2004022672 | 1/2004 |
| JP | 2006295135 | 10/2006 |

OTHER PUBLICATIONS

"Office Action of China Counterpart Application", issued on Oct. 25, 2023, with English translation thereof, p. 1-p. 21.

Office Action of China Counterpart Application, with English translation thereof, issued on May 5, 2023, pp. 1-27.

"Office Action of Korea Counterpart Application", issued on May 13, 2024, with English translation thereof, pp. 1-9.

* cited by examiner

RESISTOR UNIT, MANUFACTURING METHOD THEREFOR, AND DEVICE PROVIDED WITH RESISTOR UNIT

CROSS-REFERENCE TO RELATED APPLICATION

This application is a 371 application of the International PCT application serial no. PCT/JP2020/031622, filed on Aug. 21, 2020, which claims the priority benefit of Japan Patent Application No. 2019-161270, filed on Sep. 4, 2019. The entirety of each of the above-mentioned patent applications is hereby incorporated by reference herein and made a part of this specification.

TECHNICAL FIELD

The present invention relates to a resistor unit such as a thermosensitive resistor unit, a manufacturing method for a resistor unit, and a device provided with a resistor unit.

RELATED ART

A resistance value indicated by, for example, a thermistor as a thermosensitive resistor unit, depends on constituent materials of the thermistor, or a mixing ratio, manufacturing conditions, size and the like of the materials. Hence, the resistance value indicated by the thermistor tends to vary.

Therefore, in order to correct and reduce variation in the resistance value indicated by the thermistor, a method is adopted in which an electrode surface of the thermistor or a portion of a thermistor body is cut off and trimmed by laser irradiation or sandblasting.

PRIOR-ART DOCUMENTS

Patent Documents

Patent Document 1: Japanese Patent Laid-open No. S56-54321

Patent Document 2: Japanese Patent Laid-open No. S57-206003

Patent Document 3: Japanese Patent Laid-open No. H2-58803

Patent Document 4: Japanese Patent Laid-open No. H6-77007

Patent Document 5: Japanese Patent Laid-open No. 2004-22672

SUMMARY OF THE INVENTION

Problems to Be Solved by the Invention

However, in a thermistor shown in Patent Document 1, a peripheral edge of an electrode is trimmed as shown in FIG. 14 and FIG. 15. FIG. 14 shows a plan view of a thermistor body, and FIG. 15 shows a cross section taken along line X-X in FIG. 14. A thermistor body 10 is made of a thermistor material, and electrodes 10*a* and 10*b* are formed on both sides of the thermistor body 10. A peripheral edge of the electrode 10*a* is removed (10*c*) by trimming.

Due to the trimming, a resistance value indicated by the thermistor is increased so as to correct variation. However, during trimming, there is a risk that a metal component of the electrode 10*a* may scatter and adhere to a side surface 10*d* exposing the thermistor body 10, a short circuit or migration may occur between the electrodes 10*a* and 10*b*, and insulation properties may deteriorate.

In a thermistor shown in Patent Document 2, a thermistor body is removed by trimming, and a problem arises in which damage to the thermistor body is increased.

The present invention has been made in view of the above problems, and an object thereof is to provide a resistor unit that ensures insulation, suppresses damage and is highly reliable, a manufacturing method therefor, and a device provided with a resistor unit.

Means for Solving the Problems

A resistor unit according to an embodiment of the present invention is characterized as follows. The resistor unit includes a resistor and at least one pair of electrode layers formed on the resistor. In at least one of the electrode layers, a removal part for trimming is formed in a region in a formation region of the electrode layer, the region excluding a peripheral edge.

According to such an invention, a resistor unit can be provided that ensures insulation and is highly reliable. It is fine if the resistor unit has resistance regardless of its characteristics, and examples thereof include one that merely has electrical resistance, and a thermistor or a varistor that has a negative or positive temperature coefficient as a thermosensitive resistor unit.

A device provided with a resistor unit according to an embodiment of the present invention is characterized by including the aforesaid resistor unit.

The resistor unit can be suitably provided and applied in various devices that require high-precision control, such as a home appliance such as an air conditioner, a refrigerator or a water heater, or an in-vehicle device of an automobile or the like. The device in which the resistor unit is particularly applied is not limited.

A manufacturing method for a resistor unit according to an embodiment of the present invention is a manufacturing method for a resistor unit including a resistor in which a pair of electrode layers is formed. The manufacturing method is characterized by including the following process. In a formation region of the electrode layer, a peripheral edge is left, a removal part for trimming is formed in a region excluding the peripheral edge, and a resistance value is adjusted.

Although a laser beam from a laser processing machine is suitably used in forming the removal part for trimming, sandblasting or a blade, for example, may also be used, and the means of forming the removal part is not particularly limited.

Effects of the Invention

According to an embodiment of the present invention, there can be provided a resistor unit that ensures insulation, suppresses damage and is highly reliable, a manufacturing method therefor, and a device provided with a resistor unit.

DESCRIPTION OF THE EMBODIMENTS

Figure 1:
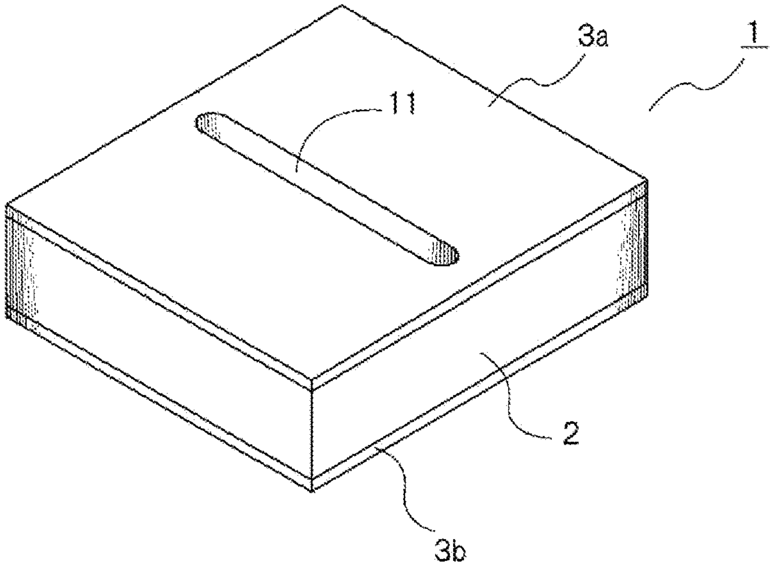
FIG. 1 is a perspective view showing a resistor unit according to an embodiment of the present invention.
Figure 2:
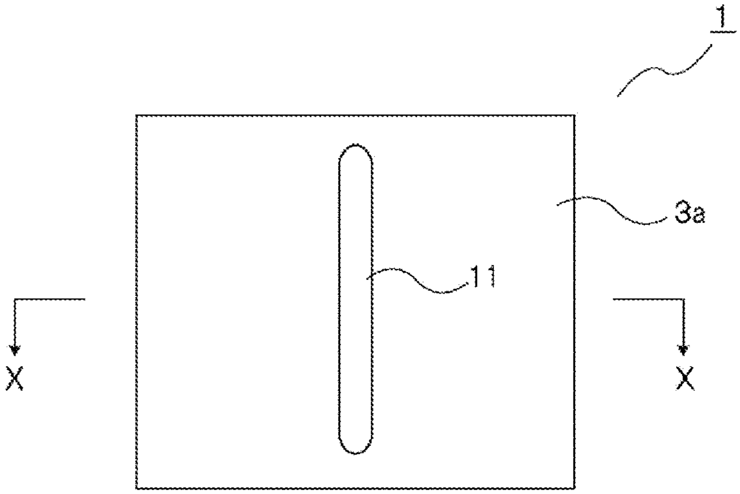
FIG. 2 is a plan view showing the resistor unit.
Figure 3:
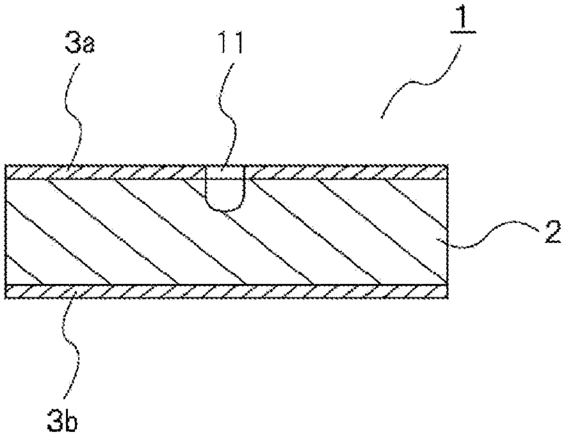
FIG. 3 is a cross-sectional view taken along line X-X in FIG. 2.

Hereinafter, a resistor unit according to an embodiment of the present invention will be described with reference to FIG. 1 to FIG. 3 schematically showing the resistor unit. FIG. 1 is a perspective view showing the resistor unit, FIG. 2 is a plan view showing the resistor unit, and FIG. 3 is a cross-sectional view taken along line X-X in FIG. 2. In each drawing, the scale of each member is appropriately changed in order to make the size of each member recognizable.

As shown in FIG. 1, a resistor unit 1 is a thermistor having thermosensitive performance, and includes a thermosensitive sintered body 2 as a thermosensitive resistor and a pair of electrode layers 3*a* and 3*b* formed on both sides of the thermosensitive sintered body 2. A removal part 11 for trimming is formed in at least one of the electrode layers 3*a* and 3*b*.

The thermosensitive sintered body 2 is formed in a substantially rectangular parallelepiped shape, is composed of two or more elements selected from among transition metal elements such as manganese (Mn), nickel (Ni), cobalt (Co), iron (Fe), yttrium (Y), chromium (Cr), copper (Cu), and zinc (Zn), and is composed of an oxide thermistor material containing, as a main component, a composite metal oxide having a crystal structure. A subcomponent may be contained in order to improve characteristics or the like. The composition and content of the main component and the subcomponent can be appropriately determined according to the desired characteristics.

The thermosensitive sintered body 2 may be composed of silicon (Si)-based ceramics such as silicon carbide (SiC) and silicon nitride (Si3N4). Further, the shape of the thermosensitive sintered body 2 is not limited to the substantially rectangular parallelepiped shape, and can be appropriately selected from a disk shape, a polygonal shape or the like.

The pair of electrode layers 3*a* and 3*b* is formed by being laminated on substantially the entire surface of one side of the thermosensitive sintered body 2 and the other side facing the one side. The electrode layers 3*a* and 3*b* contain a noble metal or a noble metal oxide, such as silver (Ag), gold (Au), platinum (Pt), palladium (Pd), osmium (Os), iridium oxide ($IrO_2$), rhodium oxide ($Rh_2O_3$), and ruthenium oxide ($RuO_2$). The electrode layers 3*a* and 3*b* have a thickness dimension of about 1 μm.

The removal part 11 for trimming is formed on one surface side (electrode layer 3*a*) of the electrode layers 3*a* and 3*b*. The removal part 11 for trimming is formed by laser beam irradiation using a laser processing machine. Specifically, a formation region of the electrode layers 3*a* and 3*b* is substantially the entire surface of both sides of the thermosensitive sintered body 2. The removal part 11 for trimming is formed on one surface side (electrode layer 3*a*) and in a region in the formation region where a peripheral edge is left and the peripheral edge is excluded from the region.

In the present embodiment, the removal part 11 for trimming is formed in a linear shape in a vertical direction in the drawing in a substantially central part of the formation region of the electrode layer 3*a*. Accordingly, the removal part 11 for trimming at least does not reach an end at an outermost peripheral edge in the formation region of the electrode layer 3*a*, and is formed without removing the end.

More specifically, a depth dimension of the removal part 11 for trimming exceeds the electrode layer 3*a* and reaches the thermosensitive sintered body 2 which is a resistor, and a state is achieved in which a portion of an upper surface of the thermosensitive sintered body 2 is removed. A thickness dimension of the resistor unit 1 is about 240 μm to 360 μm and is designed to be 300 μm. The removal part 11 has a width dimension of about 20 μm to 80 μm and a depth dimension of about 5 μm to 180 μm. The depth dimension is preferably set within 50% of the thickness dimension.

According to such a configuration, a resistance value of the resistor unit 1 is mainly inversely proportional to the area of the electrode layers 3*a* and 3*b*. Thus, a length dimension or width dimension of the removal part 11 for trimming is appropriately adjusted, the area of the removal part 11 for trimming is adjusted, and the removal part 11 for trimming can be formed. Accordingly, it is possible to adjust the resistance value of the resistor unit 1 and correct variation in each resistor unit 1.

In the formation region of the electrode layers 3*a* and 3*b*, since the removal part 11 for trimming is formed in the region excluding the peripheral edge while the peripheral edge is left, when the removal part 11 for trimming is formed as conventionally as described above, it can be avoided that a metal component of the electrode layers 3*a* and 3*b* scatters and adheres to a side surface exposing the thermosensitive sintered body 2. Accordingly, it is possible to ensure insulation and improve reliability.

The removal part for trimming is preferably formed by a removal of from the electrode layer to the thermosensitive sintered body. However, it is fine to remove only the electrode layer without removing the thermosensitive sintered body. The removal part for trimming may be formed on both sides of the electrode layer. The form (shape) of the removal part can be a linear shape, a curved shape, a dot-like shape or a circular shape, and is not limited to a particular form. In the removal part, the number of the linear shape may be plural, the number of dots may be selected, or the size of the circular shape may be changed, and the area of the removal part can be adjusted.

Figure 4:
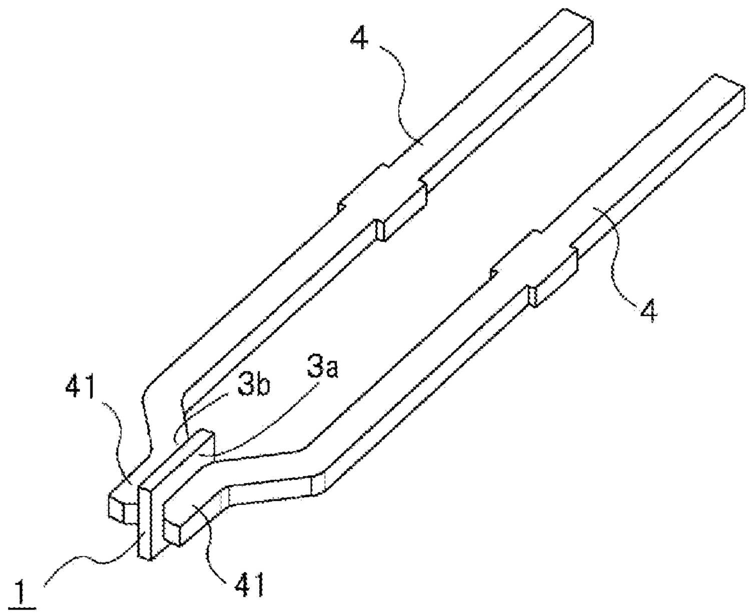
FIG. 4 is a perspective view showing a state in which a lead wire is connected to the resistor unit.
Figure 5:
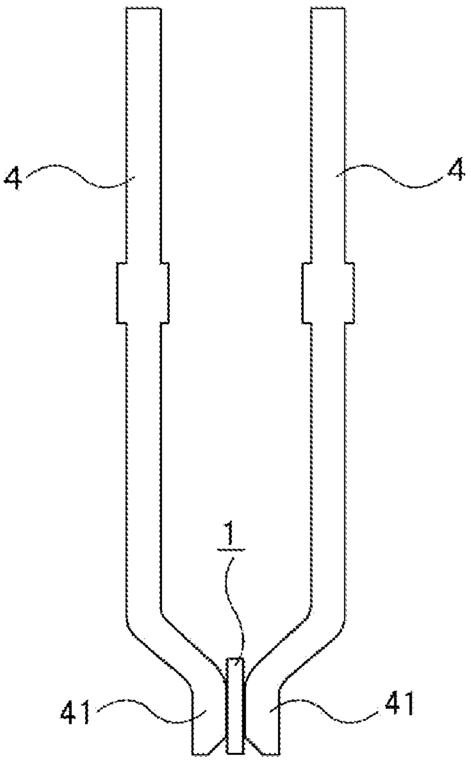
FIG. 5 is a front view showing a state in which a lead wire is connected to the resistor unit.
Figure 6:
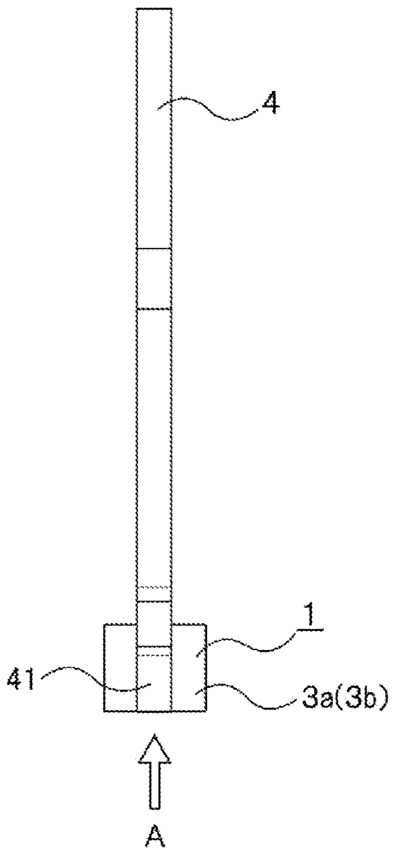
FIG. 6 is a side view showing a state in which a lead wire is connected to the resistor unit.
Figure 7:
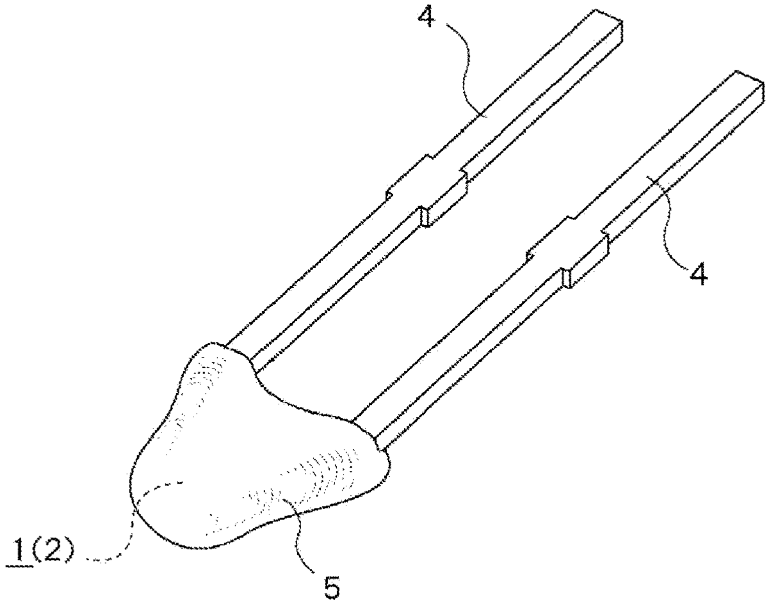
FIG. 7 is a perspective view showing a state in which the resistor unit is sealed.

Next, a state in which a lead wire is connected to the above resistor unit 1 will be described with reference to FIG. 4 to FIG. 9. FIG. 4 to FIG. 6 show a state before the lead wire is connected to the resistor unit. FIG. 4 is a perspective view, FIG. 5 is a front view, and FIG. 6 is a side view. FIG. 7 shows a state in which the resistor unit is sealed after the lead wire has been connected to the resistor unit, and FIG. 8 is a cross-sectional view showing a state in which the lead wire has been connected to the resistor unit.

As shown in FIG. 4 to FIG. 6, a lead wire 4 is provided in pair, and a tip thereof is bent so as to contact the electrode layers 3*a* and 3*b* to form a joining part 41. The lead wire 4 has, for example, a square shape in cross section, and a tin-plated 42 alloy is suitably used as a material thereof. As the material of the lead wire 4, copper (Cu), iron (Fe), chromium (Cr), nickel (Ni), aluminum (Al), zinc (Zn), titanium (Ti) or an alloy containing at least one of the foregoing can be used. The joining part 41 of the lead wire 4 like this is joined to and electrically connected to the electrode layers 3*a* and 3*b* by soldering.

As shown in FIG. 7, the resistor unit 1 to which the lead wire 4 is connected is sealed by a sealing material 5. The sealing material 5 covers and protects a junction of the thermosensitive sintered body 2 and the lead wire 4, and an insulating resin such as an epoxy resin having a high heat resistance temperature is used therefor. Accordingly, the junction of the thermosensitive sintered body 2 and the lead wire 4 is effectively protected even when used in a high-temperature environment.

Figure 8:
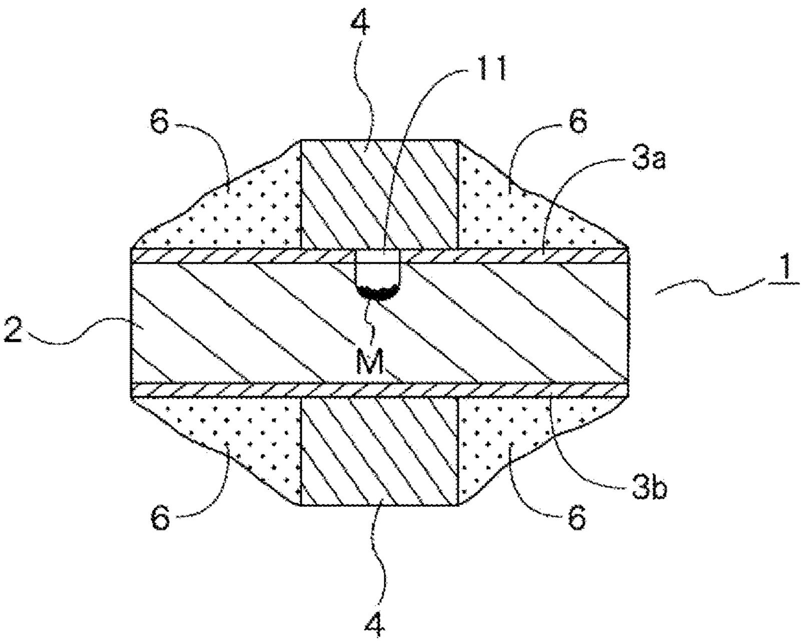
FIG. 8 is a cross-sectional view showing a state after a lead wire has been connected to the resistor unit.

As shown in FIG. 8, the lead wire 4 is joined to and electrically connected to the electrode layers 3*a* and 3*b* of the resistor unit 1 by the soldering part 6 by soldering. In FIG. 8, the sealing material 5 is omitted from illustration.

The lead wire 4 is disposed and soldered so as to straddle the removal part 11 for trimming. Hence, the connection of the lead wire 4 can be ensured.

When the removal part 11 for trimming is formed, a conductive substance M such as a metal component of the electrode layer 3*a* may scatter and adhere to a bottom of the removal part 11. In this case, if the removal part 11 includes only the electrode layer 3*a,* since the thickness dimension of the electrode layer 3*a* is as small as about 1 μm, when the soldering part 6 changes shape due to thermal expansion, there is a possibility that a solder material may enter the removal part 11 and the resistance value may change. However, in the present embodiment, since the removal part 11 for trimming is formed by a removal of from the electrode layer 3*a* to the thermosensitive sintered body 2, even if the soldering part 6 changes shape due to thermal expansion, the solder material can be prevented from contacting the conductive substance M such as a metal oxide component and a metal component adhering to the bottom of the removal part 11. Accordingly, a problem that the resistance value may change can be prevented.

Figure 9:
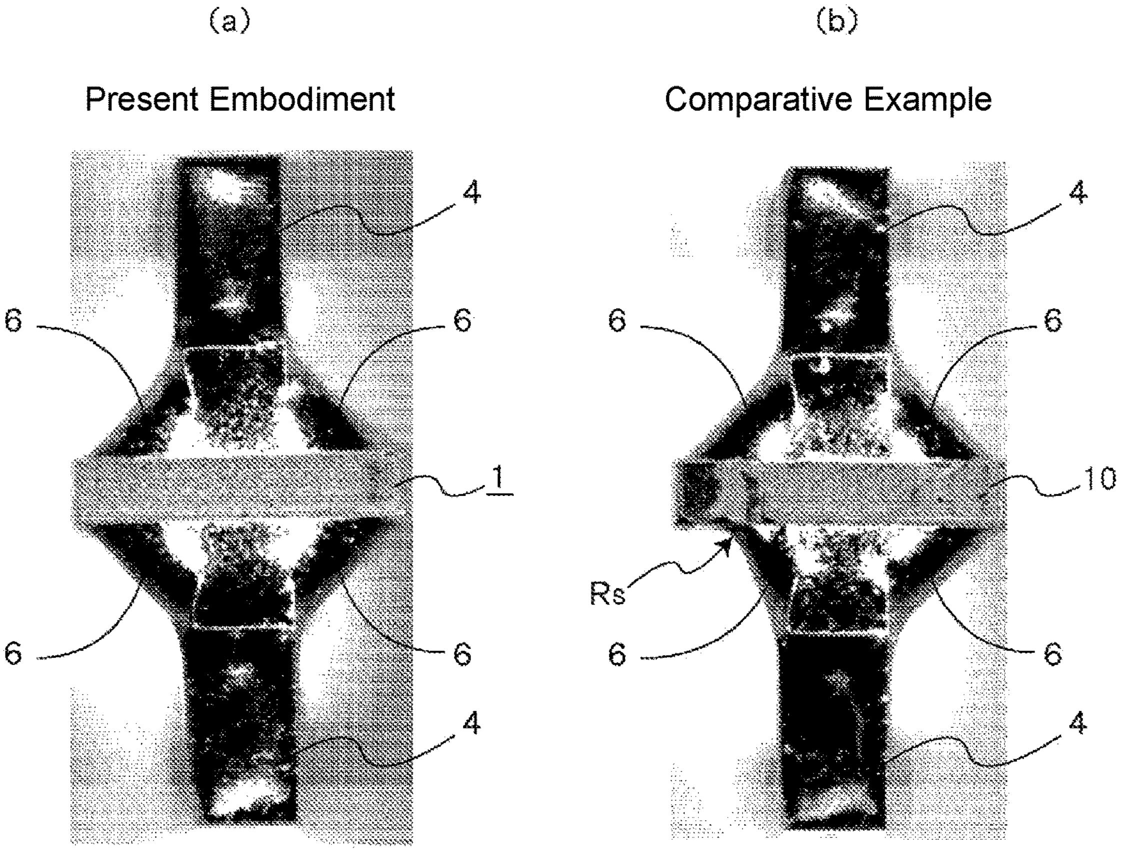
FIG. 9 is photographs showing a state of a fillet by soldering after a lead wire has been connected to the resistor unit, in which (a) of FIG. 9 shows the present embodiment, and (b) of FIG. 9 shows a comparative example.
Figure 14:
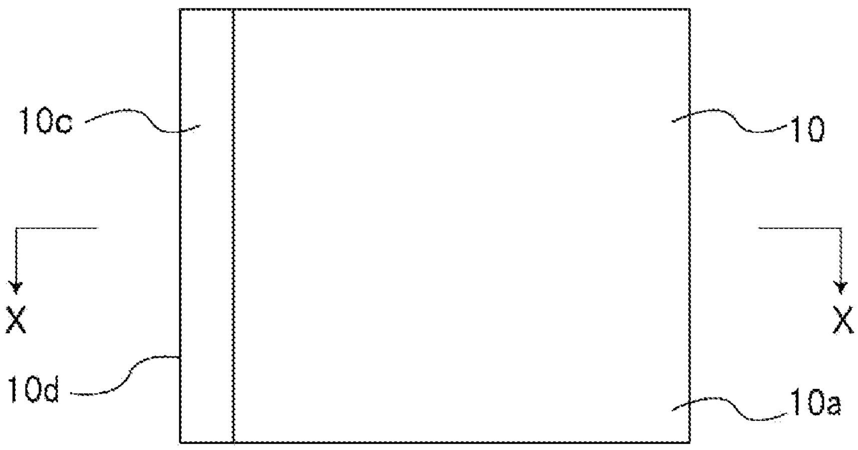
FIG. 14(Related Art)
FIG. 14 is a plan view showing a resistor unit of a conventional example.
Figure 15:
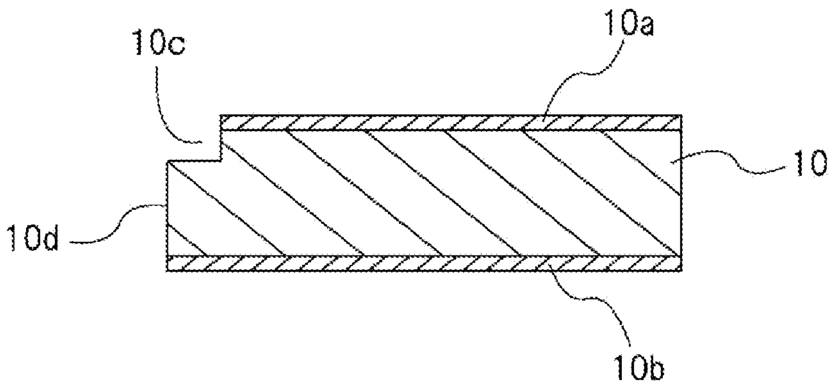
FIG. 15 (Related Art)
FIG. 15 is a cross-sectional view taken along line X-X in FIG. 14.

Further, a fillet by soldering will be described with reference to FIG. 9 as well. FIG. 9 is photographs shown as seen in the direction of arrow A in FIG. 6. As shown in (a) of FIG. 9, in the present embodiment, the fillet by soldering, that is, the shape of the soldering part 6 that spreads toward the bottom achieves a good shape substantially even on the left and right sides. In contrast, in the comparative example shown in (b) of FIG. 9, since a peripheral edge of an electrode is removed by trimming as shown in FIG. 14 and FIG. 15, one side of the fillet is formed into a recessed shape Rs to which solder does not adhere. Accordingly, in the comparative example, there is a risk that a problem such as conduction failure or falling-off of a resistor unit 10 may occur.

In the present embodiment, a fillet can be formed having a good shape equivalent to that in which the removal part 11 for trimming is not formed, and the problem such as conduction failure or falling-off of the resistor unit 1 can be avoided.

Figure 10:
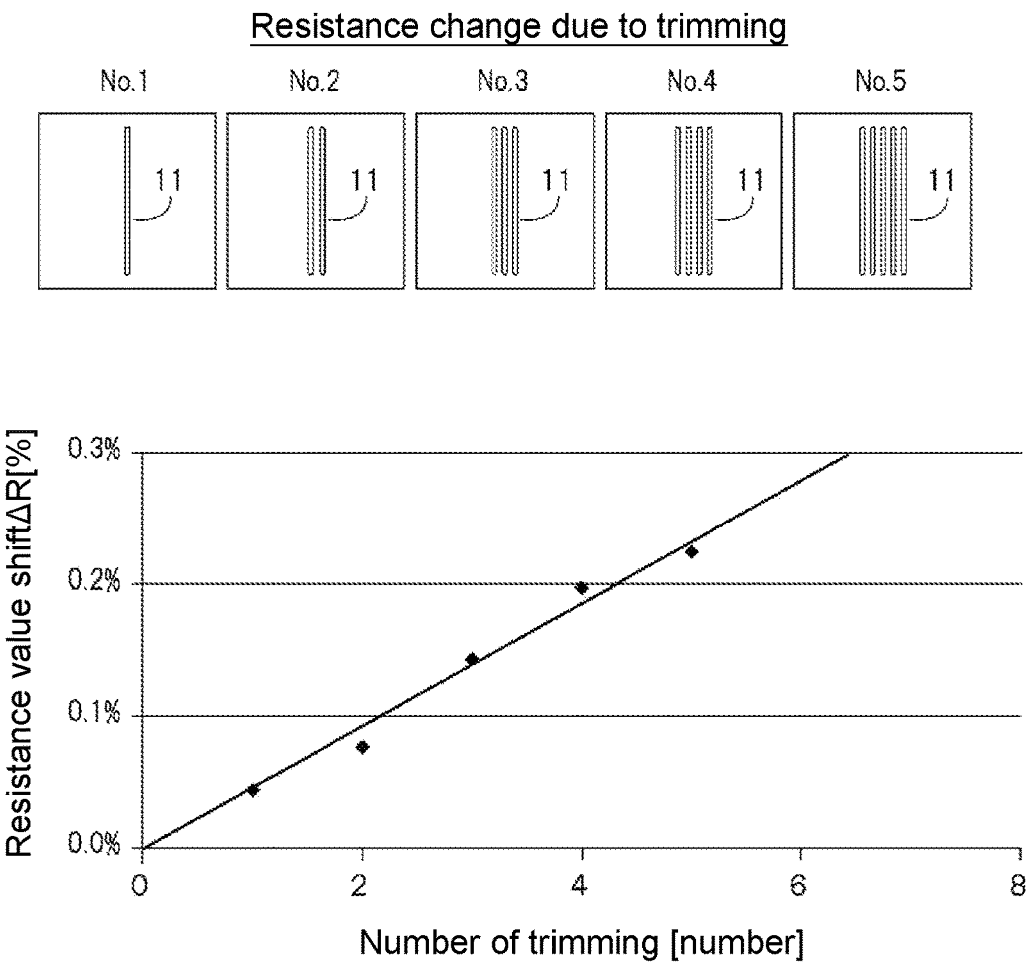
FIG. 10 is a graph showing a relationship between area of a removal part for trimming and change in resistance value.

Next, a relationship between the area of the removal part 11 for trimming and change (adjustment) in the resistance value will be described with reference to FIG. 10. Specifically, the area of the removal part 11 for trimming is represented by the number of the removal part 11 in a linear shape, and change (adjustment) in the resistance value is represented by a ratio of increase in the resistance value as a resistance value shift ΔR. Accordingly, the horizontal axis indicates the number of trimming [number], and the vertical axis indicates the resistance value shift ΔR [%].

As a sample of a resistor unit, five samples, namely, No. 1 to No. 5, are prepared and the ratio of increase in the resistance value is measured. The samples No. 1 to No. 5 are shown in plan view, in which there are respectively formed one to five removal parts 11 in a linear shape.

As shown in the drawing, it is known that the resistance value increases in proportion to the number of the removal part 11. That is, as the area of the removal part 11 increases, the resistance value increases. Accordingly, by adjusting the area of the removal part 11, the resistance value can be adjusted and variation in the resistance value of the resistor unit 1 can be corrected.

Figure 11:
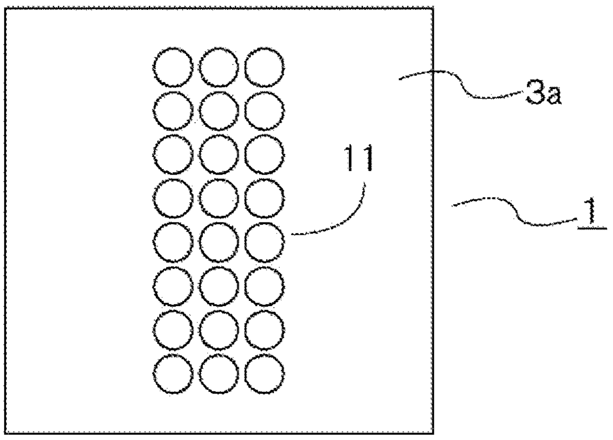
FIG. 11 is a plan view showing a modification of a removal part for trimming.

FIG. 11 shows a modification of the removal part 11 for trimming. FIG. 11 is a plan view showing a resistor unit, showing a pattern in which the removal part 11 for trimming is formed in a dot-like shape. The removal part 11 in a dot-like shape is formed in a plurality of rows, specifically, three rows. Even in such a pattern, the same effects as those of the above embodiment can be obtained.

Next, a manufacturing method for a resistor unit of the present embodiment, specifically, a resistance value adjustment method by trimming will be described.

In the thermosensitive sintered body 2 as a resistor in which the pair of electrode layers 3*a* and 3*b* is formed, the removal part 11 for trimming is formed and the resistance value is adjusted.

When the removal part 11 for trimming is formed, the formation is performed by laser beam irradiation using a laser processing machine. Accordingly, the following process is included. In the formation region of the electrode layers 3*a* and 3*b,* the peripheral edge is left, the region excluding the peripheral edge is irradiated with a laser beam and the removal part 11 for trimming is formed, and the resistance value is adjusted.

The laser processing machine is equipped with an XY-axis servomotor. The XY-axis servomotor is controlled by a control device so that a laser irradiation head moves in an XY-axis direction by driving the XY-axis servomotor. Accordingly, it is possible to increase the degree of freedom in selecting the form (shape) of the removal part 11 for trimming.

Although a laser beam is suitably used in forming the removal part 11 for trimming, sandblasting or a blade, for example, may also be used, and the formation means is not particularly limited.

Figure 12:
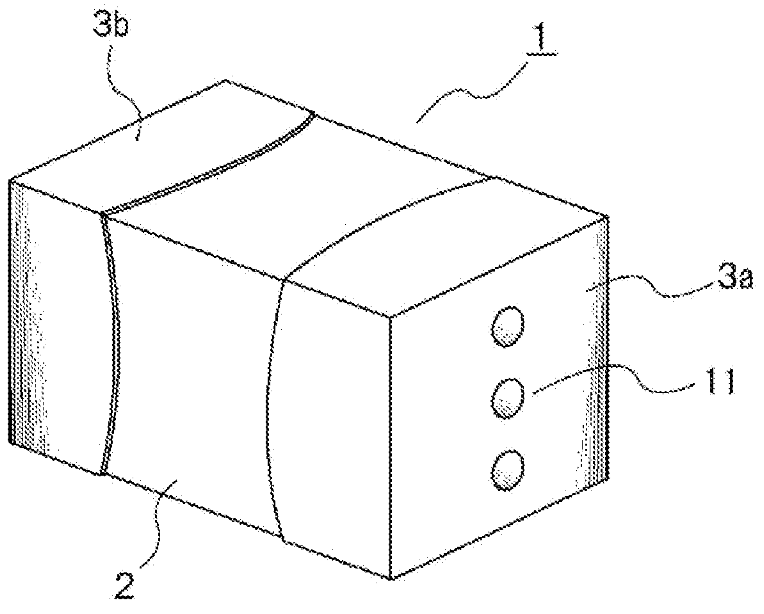
FIG. 12 is a perspective view showing a resistor unit of a different type from that of the resistor unit (Example 1).
Figure 13A:
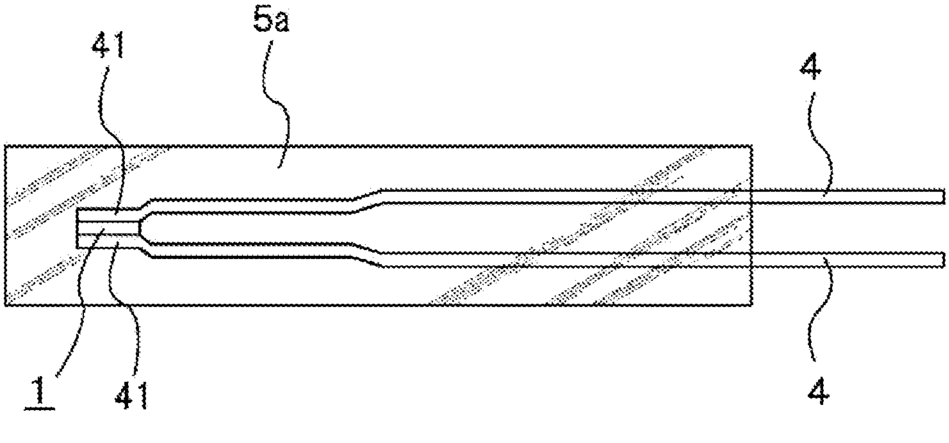
FIG. 13(*a*) is a plan view and FIG. 13(*b*) is a side view showing a resistor unit of a different type from that of the resistor unit (Example 2).
Figure 13B:
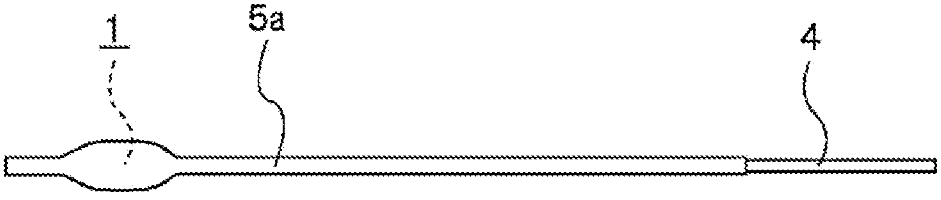

Subsequently, a resistor unit of a different type from that of the above embodiment will be described with reference to FIG. 12 and FIG. 13. FIG. 12 shows a perspective view of the resistor unit, and FIG. 13 shows a plan view and a side view of the resistor unit. The same or equivalent portions to those of the above embodiment are assigned the same reference numerals, and repeated descriptions will be omitted.

EXAMPLE 1

In FIG. 12, the electrode layers 3*a* and 3*b* are formed extending from one side to four sides in a longitudinal direction in the drawing so as to cover both sides of the thermosensitive sintered body 2. A plurality of the removal parts 11 for trimming in a circular shape are formed in the electrode layer 3*a* on one side. That is, in the formation region of the electrode layer 3*a* that includes the one side and the four sides extending in the longitudinal direction from the one side, the removal part for trimming is formed in the region excluding the peripheral edge. The four sides of the thermosensitive sintered body 2 in the longitudinal direction may be insulatingly coated with a glass coating or the like. In this case, an exposed portion of the thermosensitive sintered body 2 is in a state of being insulatingly coated with the glass coating or the like.

EXAMPLE 2

FIG. 13 shows that the resistor unit 1 to which the lead wire 4 is connected is sealed by, as a sealing material, a resin film 5*a* which is an insulating resin. The resin film 5*a* covers and protects the resistor unit 1 and a portion of the lead wire 4. As the resin film 5*a*, for example, a polyethylene terephthalate (PET) film is suitably used.

According to each example as described above, the same effects as those of the above embodiment can be obtained.

It is fine if the resistor unit has resistance regardless of its characteristics, and examples thereof include one that merely has electrical resistance, and a thermistor or a varistor that has a negative or positive temperature coefficient as a thermosensitive resistor unit.

The above resistor unit can be suitably provided and applied in various devices that require high-precision control, such as a home appliance such as an air conditioner, a refrigerator or a water heater, or an in-vehicle device of an automobile or the like. The device in which the resistor unit is particularly applied is not limited.

The present invention is not limited to the configuration in the above embodiment, and may be modified in various ways without departing from the gist of the invention. The above embodiment is presented as one example and is not intended to limit the scope of the invention. These novel embodiments may be implemented in other various forms, and may be omitted, replaced, or changed in various ways. These embodiments and modifications thereof are included in the scope and gist of the invention, and are also included in the scope of the invention described in the claims and the equivalent scope thereof.

What is claimed is:

1. A resistor unit comprising:

a resistor; and at least one pair of electrode layers formed on one surface and another surface opposite to the one surface of the resistor, wherein in at least one of the at least one pair of electrode layers, a removal part for trimming is formed in a region in a formation region of the electrode layer, the region excluding a peripheral edge, wherein a lead wire is connected to the at least one pair of electrode layers by soldering, and the lead wire straddles the removal part for trimming.

2. The resistor unit according to claim 1, wherein the resistor is a thermosensitive resistor.

3. The resistor unit according to claim 1, wherein a depth dimension of the removal part for trimming is formed by a removal of from the at least one pair of electrode layers to the resistor.

4. The resistor unit according to claim 1, wherein the removal part for trimming has a linear shape or a curved shape.

5. The resistor unit according to claim 1, wherein the removal part for trimming has a dot-like shape.

6. The resistor unit according to claim 1, wherein a junction of the resistor and the lead wire is covered with a sealing material comprising an insulating resin.

7. A device provided with a resistor unit, comprising the resistor unit according to claim 1.

8. A manufacturing method for a resistor unit, the resistor unit comprising a resistor in which a pair of electrode layers is formed on one surface and another surface opposite to the one surface of the resistor, wherein the manufacturing method comprises:

in a formation region of the pair of electrode layers, leaving a peripheral edge, forming a removal part for trimming in a region excluding the peripheral edge, and adjusting a resistance value, and connecting a lead wire to the pair of electrode layers by soldering, wherein the lead wire straddles the removal part for trimming.

9. The manufacturing method for a resistor unit according to claim 8, wherein a laser processing machine equipped with an XY-axis servomotor is used.

10. The resistor unit according to claim 2, wherein a depth dimension of the removal part for trimming is formed by a removal of from the at least one pair of electrode layers to the resistor.

* * * * *